United States Patent
Duvall

(10) Patent No.: US 7,828,270 B2
(45) Date of Patent: Nov. 9, 2010

(54) QUICK ATTACH OFF-ROAD RECOVERY DEVICE FOR SKID STEER LOADER OR SIMILAR MACHINE

(75) Inventor: Carnel C. Duvall, P.O. Box 355, Quinton, OK (US) 74561

(73) Assignee: Carnel C. Duvall, Quinton, OK (US)

( * ) Notice: Subject to any disclaimer, the term of this patent is extended or adjusted under 35 U.S.C. 154(b) by 158 days.

(21) Appl. No.: 11/973,830

(22) Filed: Oct. 10, 2007

(65) Prior Publication Data

US 2008/0089767 A1 Apr. 17, 2008

Related U.S. Application Data

(60) Provisional application No. 60/851,893, filed on Oct. 16, 2006.

(51) Int. Cl.
*B66D 1/00* (2006.01)
*B66C 23/44* (2006.01)
*B66F 9/00* (2006.01)

(52) U.S. Cl. .................. 254/323; 254/361; 414/723; 212/180

(58) Field of Classification Search .......... 254/323, 254/326–329, 380, 134.3 FT, 134.3 R; 212/232, 212/252, 347, 180; 414/723, 724, 727, 731
See application file for complete search history.

(56) References Cited

U.S. PATENT DOCUMENTS

| | | | | |
|---|---|---|---|---|
| 3,294,262 A | * | 12/1966 | Person | 414/609 |
| 4,200,423 A | * | 4/1980 | Sornsin | 414/724 |
| 4,579,504 A | * | 4/1986 | Lemme et al. | 414/607 |
| 5,120,186 A | * | 6/1992 | Jorgenson | 414/686 |
| 5,464,193 A | * | 11/1995 | Wrate | 254/134.3 FT |
| 5,954,471 A | * | 9/1999 | Cullen | 414/686 |
| 6,152,425 A | * | 11/2000 | Boyer | 254/323 |
| 6,301,809 B1 | * | 10/2001 | Staggs, Jr. | 37/444 |
| 6,481,949 B1 | * | 11/2002 | Cullen | 414/686 |
| 6,494,437 B1 | * | 12/2002 | Boyer | 254/323 |
| 6,543,749 B1 | * | 4/2003 | Duvall | 254/323 |
| 7,175,367 B2 | * | 2/2007 | Hau | 405/184.3 |
| 7,431,267 B1 | * | 10/2008 | Cunningham | 254/134.3 FT |
| 7,490,814 B2 | * | 2/2009 | Hau | 254/134.3 R |

* cited by examiner

*Primary Examiner*—Evan H Langdon

(57) ABSTRACT

A quick attach stabilizing device for skid steer loaders and similar machines for performing off-road recovery, winching, and loading operations. Primarily used by wrecker service and other service companies when 4 wheel drive winch vehicles cannot drive to the off-road location due to the extremely bad ground surface conditions caused by excessive rain, snow, or ice.

4 Claims, 4 Drawing Sheets

QUICK ATTACH OFF-ROAD RECOVERY DEVICE FOR SKID STEER LOADER OR SIMILAR MACHINE

The Application claims the benefit of Provisional Patent No. 60/851,893 filed Oct. 16, 2006.

BACKGROUND OF THE INVENTION

1. Field of the Invention

The present invention relates to a stabilizing and winching combination device which mounts by quick attach on the front of a skid steer loader or similar machine. Most skid steer loaders have the quick attachment feature as standard equipment since many attachments from buckets to forks to hydraulic rotary equipment are used on these machines. The present stabilizing and winching attachment uses the same standard quick attachment plate as the other attachments mentioned.

The present invention when attached to the skid steer loader or similar machine will greatly increase the pulling power of the skid steer loader or similar machine by penetrating the ground surface with the 5 foot wide heavy blade which has serrated teeth on the bottom. This is the first step in anchoring the machine. The second step is to hydraulically power the top of the blade forward which contacts two large cast ductile iron feet which have 60 teeth into the ground. The weight of the machine is then added for more down pressure to further anchor the device for winching.

One advantage of this device is that larger vehicles or loads can be winched from further distances away since the winch spool will hold over 200 feet of cable.

Another advantage is the lack of stress on the skid steer loader or similar machine. Most skid steer loaders used for this operation have wide rubber tracks powered by steel sprockets. Rubber tracks are easily damaged by extreme pulling. With this device all the machine has to do is get to the location, anchor the device and provide the hydraulic power system to operate the winch.

The skid steer loader performs its job easily, the transmission remains in neutral and there is no stress on the rubber tracks made by the steel sprockets.

2. Description of Related Art

Presently when wrecker service companies are called to remote areas under bad conditions they work under the mileage and hourly rate charge guide regulated by State Department of Public Safety Agencies.

The mileage charge can be determined and the hourly charge per hour can be determined but the number of hours and pieces of equipment required depends on the operation and if you have the right equipment or not. Some jobs can be reached with 4 wheel drive wreckers and others cannot. The jobs that can't be reached with 4 wheel drive wreckers usually require machines with tracks.

Many wrecker services have skid steer loaders with wide rubber tracks. They load the skid steer loader on the rollback wrecker and haul it as close as they can to the stuck vehicle, unload the skid steer loader and drive it to the stuck vehicle. This is not an ideal piece of equipment for this type of work but it works most of the time with the aid of chains, cables, and blocks. If the job cannot be performed by the skid steer loader the next option is a dozer which is much more expensive due to the cost of hauling the machine and paying the operators wages. Track hoes are also used for this operation.

The present invention solves this problem fast, keeps hourly cost to a minimum and doesn't damage track parts since the winch does all the work and the skid steer loader simply transports the device, anchors it to the ground and provides the hydraulic system to power the winch. Safety is increased since this device requires less rigging with only 1 point to hookup and can be done by 1 man while the operator sits inside the cab of the skid steer loader up to 200 feet away.

The tracked skid steer loader equipped with this off road winching device is a very fast and affordable piece of equipment which will do the job and do it safely.

BRIEF SUMMARY OF THE INVENTION

The present invention is a quick attach off road recovery and anchoring device for skid steer loaders and other similar machines which have front quick attach system for buckets and other various implements that do a variety of jobs.

The device is capable of winching heavy loads from as much as 200 feet away. The device is provided with a 5 foot wide, ¾ inch thick steel blade with serrated teeth on the bottom bent at a 25 degree angle to make them penetrate the ground and travel downward to a 16 inch depth before being stopped by the large depth plate. The top of the blade is then rotated forward to bring the 2 large feet which have 60 teeth to the ground for additional anchoring. The cable and hook are then hydraulically powered out or freewheeled out from the 12,000 lbs. rated hydraulic winch and connected to the vehicle or load that is to be winched. The operator then shifts the transmission to the neutral position and controls the hydraulic winch with the machines hydraulic power supply and control valves from the safety of the machines cab.

PARTS NUMBER LIST

1 Winch
2 Winch Cable
3 Lower Rollers
4 Side Rollers
5 Side Plates
6 Attaching Straps
7 Bottom Plate
8 Cable Tentioner
9 10 inch long bar
10 Coil Spring
11 Side Roller Straps
12 Pin
13 Flanged Brass Bushing
14 Shaft Collars
15 Pin—Lower Roller
16 Course Thread Bolts
17 Winch Mounting Straps
18 Modified Winch Assembly
19 Backplate
20 Toolboxes
21 Depth Plate
22 Sharp V Cuts
23 25 Degree Forward Angle 24 Design In Cuts
25 Depth Adjuster Bars
26 Feet
27 Arms
28 Arm Brackets
29 Arm Pins
30 Teeth
31 Straight Brass Bushing
32 Adjuster Bar Brackets
33 Attaching Pins—Depth Adjuster
34 I-Beam
35 17×40 Rectangular Receiver Plate
36 Receiver Side Plates
37 Top Receiver Angle Plate
38 Upper Lock Plate
39 Trapezoid Shaped Plate
40 Plunger Lock Plate
41 Hydraulic Hoses
42 Quick Coupler Fittings
43 Winch Spool Kickout Lever
44 Hook
45 Winch Cable Spool
46 Winch Motor

DETAILED DESCRIPTION OF THE INVENTION

Figure 1:
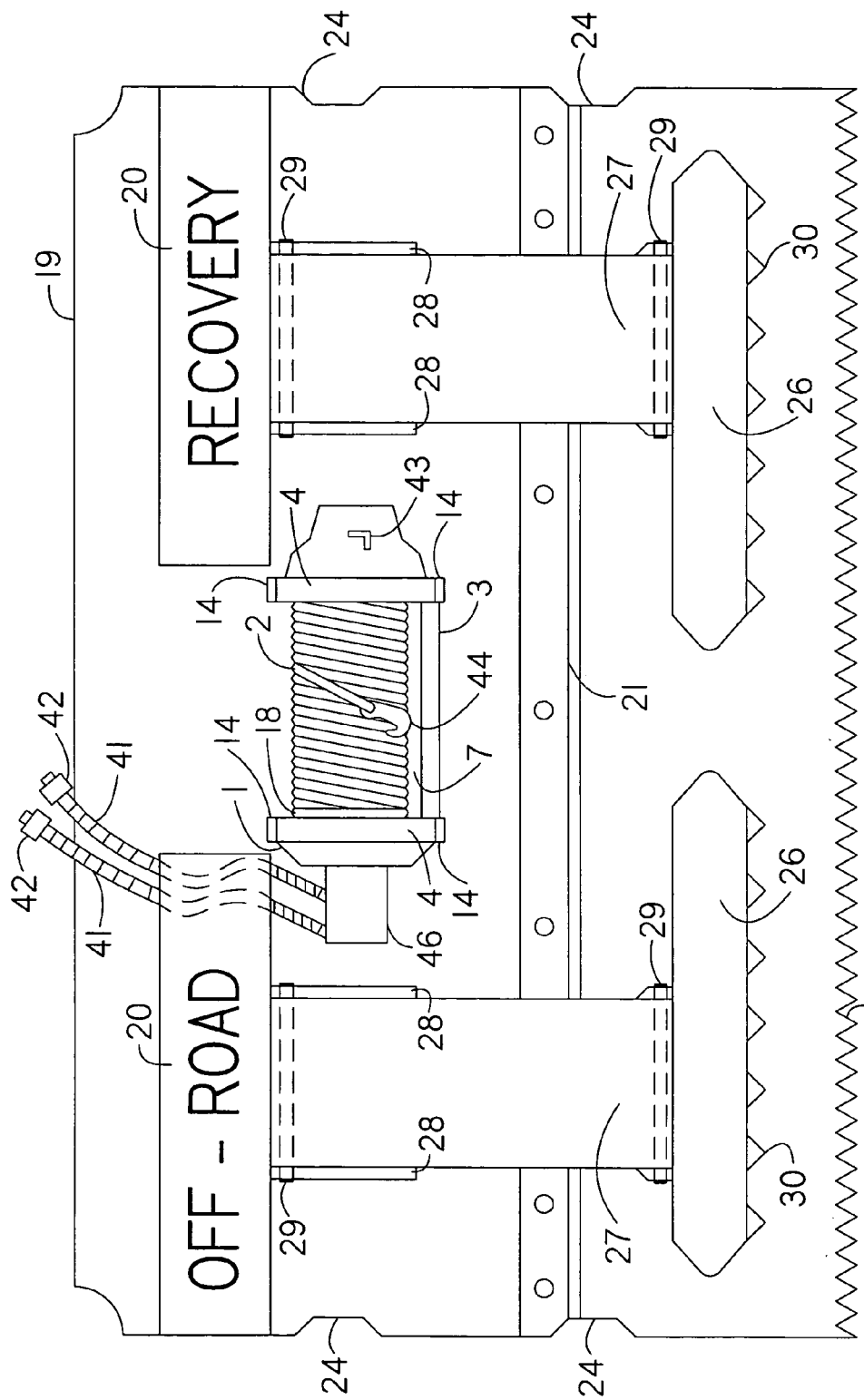
FIG. 1 is a front view of a quick attach off-road recovery device for a skid steer loader or similar machine.
Figure 2:
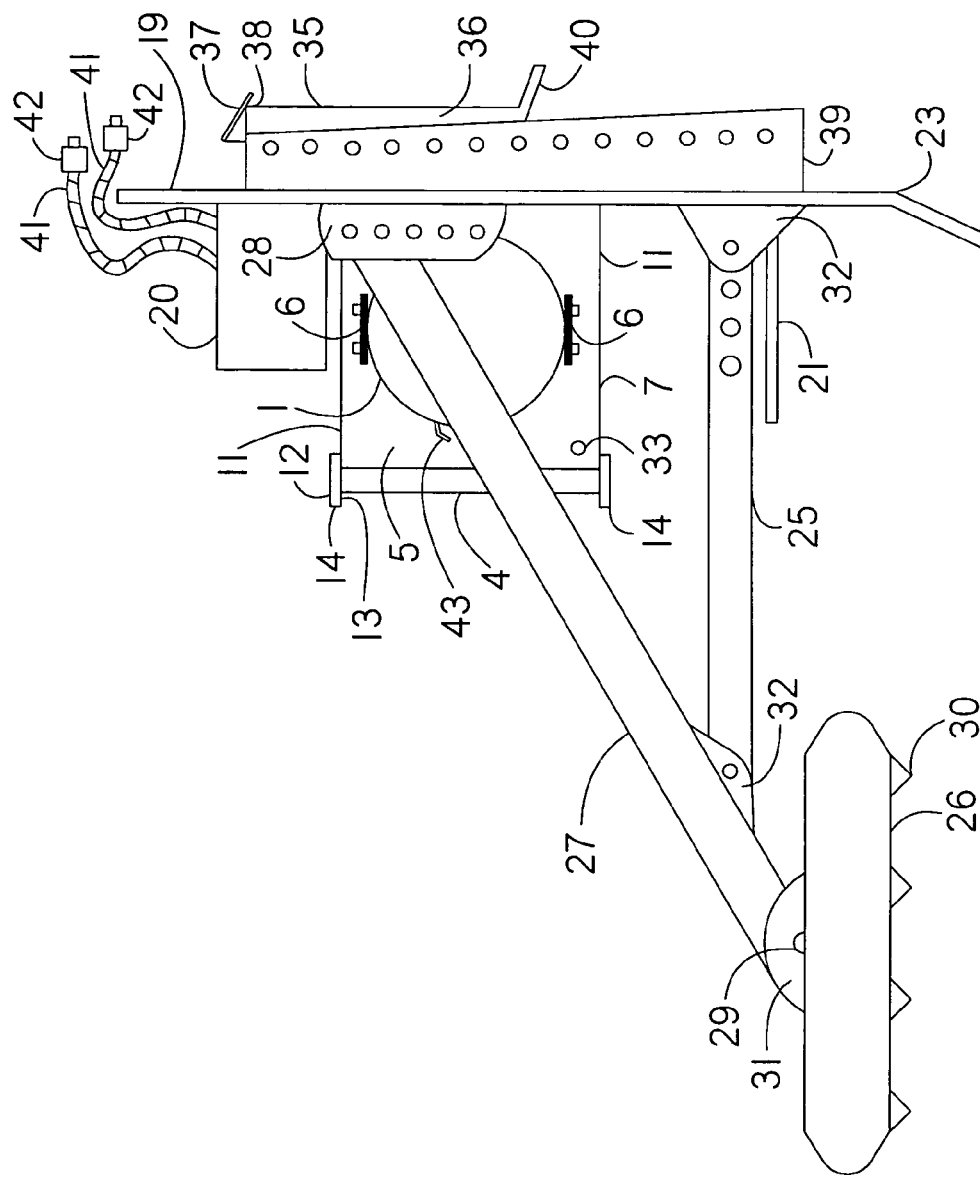
FIG. 2 is a side view of a quick attach off-road recovery device for a skid steer loader or similar machine of FIG. 1.
Figure 3:
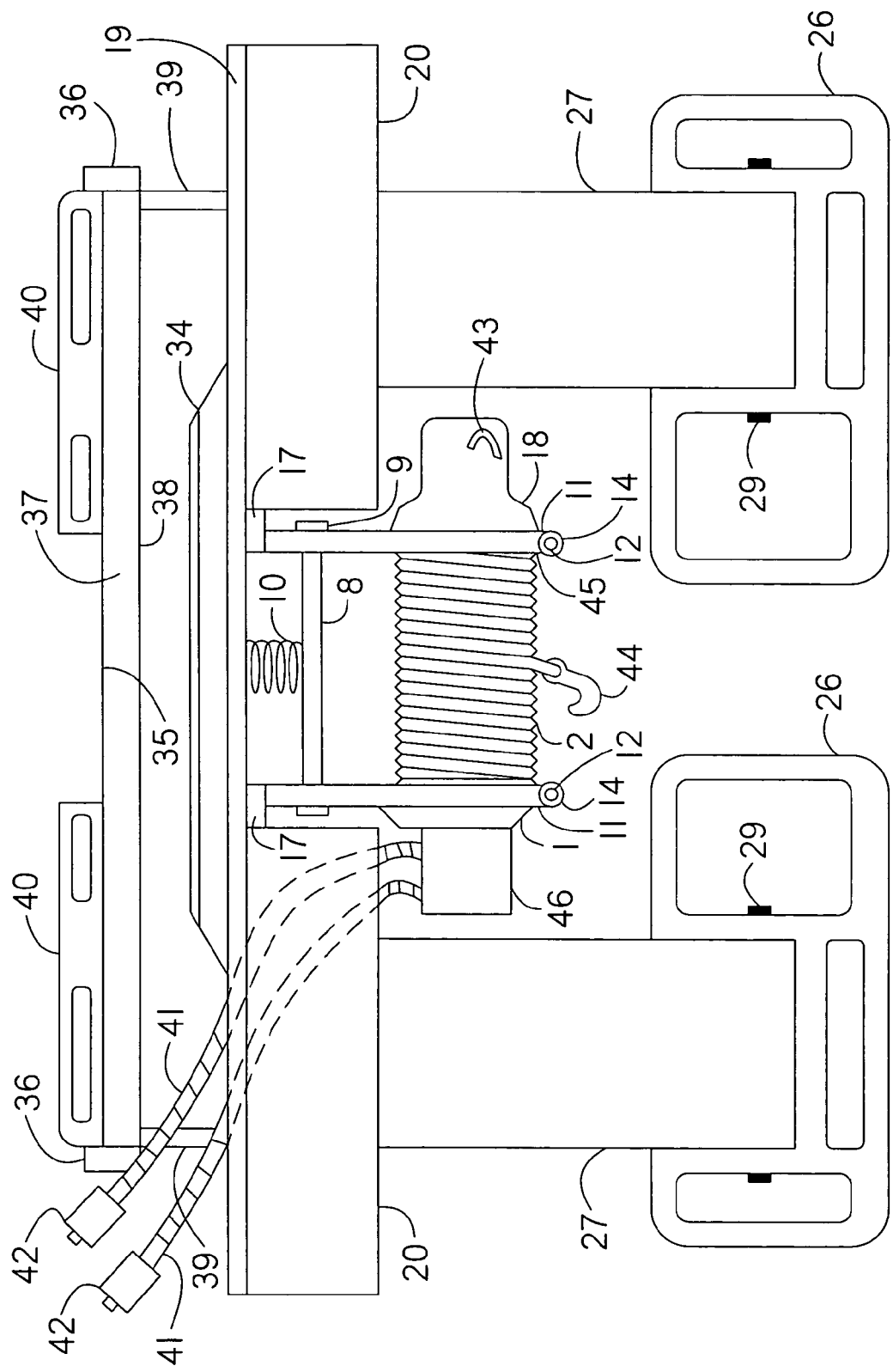
FIG. 3 is a top view of a quick attach off-road recovery device for a skid steer loader or similar machine of FIG. 1.
Figure 4:
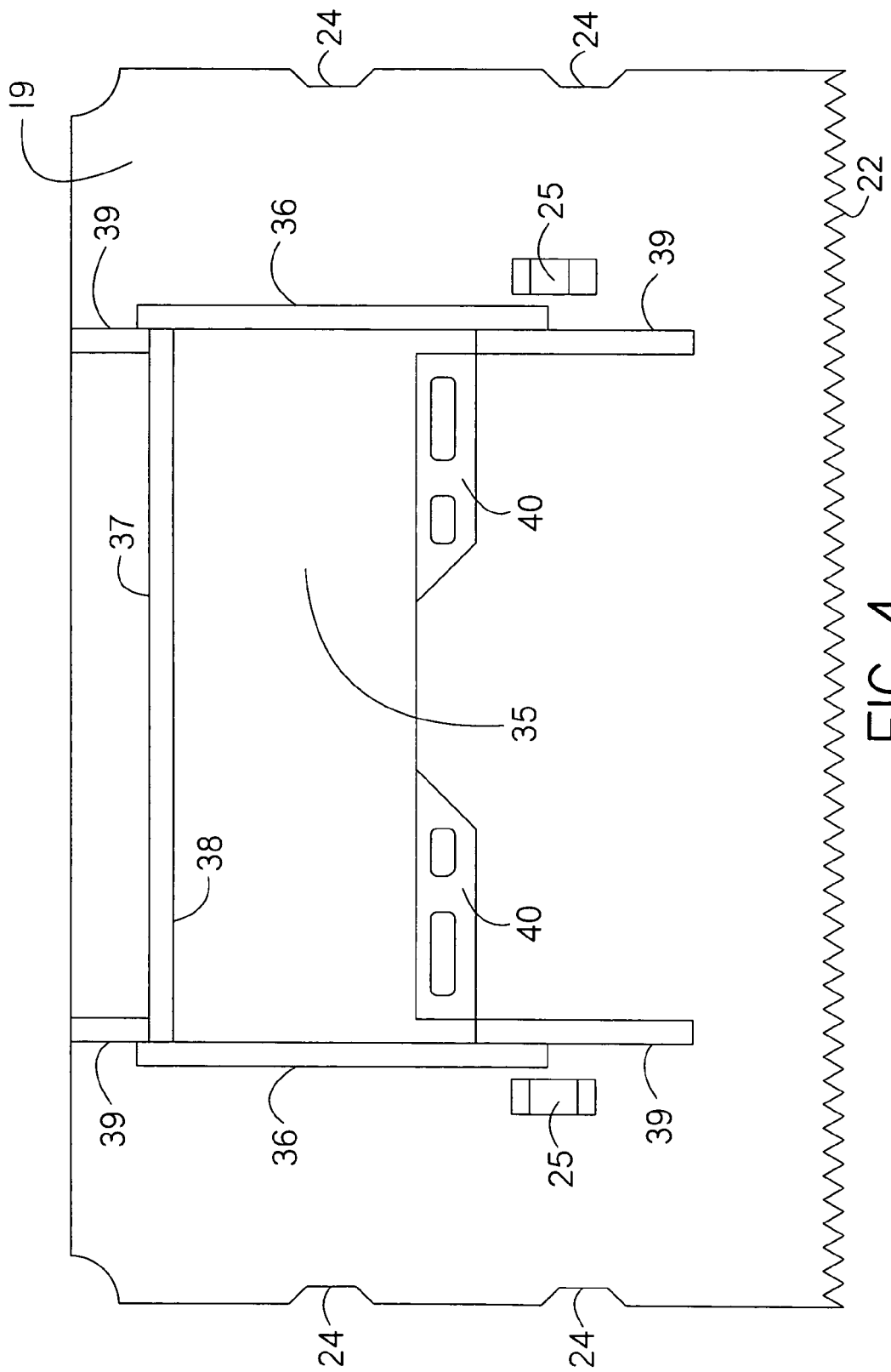
FIG. 4 is a rear view of the quick attach off-road recovery device for a skid steer loader or similar machine of FIG. 1.

Referring now to the drawings and initially to FIGS. 1 and 2, there is illustrated a quick attach off-road recovery device for a skid steer loader or similar machine constructed in accordance with a preferred embodiment of the present invention. As illustrated also in FIG. 3, the top view of the device and FIG. 4 showing the rear view of the device with quick attach parts.

This is how you make a quick attach off-road recovery device for a skid steer loader or similar machine. You start by buying a 12,000 lbs rated hydraulic winch (1). Then you modify it so it will hold more cable (2) and be able to work well with cable pressure on the lower (3) and side (4) rollers. The side plates (5) are ¼ inch steel with cutouts for the winch spool. The side plates (5) are positioned on each side of the winch (1) then the 4 attaching straps (6) are bolted to the winch (1) and then welded to the side plates (5). Next the 10×13×¼ inch bottom plate (7) is welded to the bottom of the side plates (5) which form a cage for the cable (2). The 6×10×¼ inch cable tentioner (8) is then bolted to the upper back of the side plates (5) and hinges on a 10 inch long bar (9) which connects the side plates (5) together.

Next we position the cable tentioner (8) coil spring (10) behind the cable tentioner (8). The 4 side roller straps (11) are then welded to the top and bottom of the side plates (5). Now you are ready to make the side rollers (4) and pins (12). The two side roller pins (12) are cut from 1 inch bar stock and are 14¾ inches long. Next you cut two side rollers (4) from 1¾ inch pipe which are 12¾ inches long and have an inside diameter of 1¼ inches. Once the side rollers (4) are cut you insert a flanged brass bushing (13) at each end. The side rollers (4) can then be installed in the side roller straps (11) and locked at each end by 1 inch shaft collars (14). The collars (14) are then welded to the side roller straps (11). This completes the side rollers (4) and we now make the lower roller (3) from the same pipe stock 9¾ inches long and insert flanged brass bushings (13) at each end.

The 1 inch lower roller pin (15) is cut 10 inches long and bolted to the side plates (5) with ½ inch course thread bolts (16). Next the two winch mounting straps (17) are welded to the back of the sideplates (5). The winch mounting straps (17) each have 3 mounting holes with a 13/16 inch diameter to bolt the complete modified winch assembly (18) to the backplate (19).

Next we build the two toolboxes (20) mounted on each side of the winch (1), which hold the chains used for connecting the winch cable (2) to the vehicle or load being winched. The toolboxes (20) are 20×10×8 inches and made from ⅛ inch steel plate. On the front of the toolboxes (20) are the cutout words "Off Road Recovery" which denotes the function of the device.

Then we make the backplate (19) which the complete stabilizing system, the modified winch assembly (18), the depth plate (21), and the toolboxes (20) are bolted on the front side.

The backplate (19) is made from ¾ inch steel plate and is 40 inches tall and 60 inches wide. Sharp V cuts (22) which are 1 inch tall and 1 inch wide are cut all across the bottom of the backplate (19) to penetrate the ground surface. Then 6 inches up from the bottom of the plate we bend a 25 degree forward angle (23) so the backplate (19) will dig into the ground like a plow until it reaches the desired depth and is stopped by the depth plate (21). The top and sides of the backplate (19) have design in cuts (24) to give it a more professional made appearance but have no other beneficial function. Circular holes are laser cut in the backplate (19) for mounting the other components. Rectangular holes are also laser cut in the backplate (19) to allow the depth adjuster bars (25) excess length to go through the backplate (19) and out of sight.

Next the parts are made that complete the stabilizing system and anchor the device while winching. The parts of the stabilizing system are two feet (26), two arms (27), four arm brackets (28) and arm pins (29), the depth adjustment bars (25) and the depth plate (21). The two feet (26) which are cast from ductile iron are 20 inches wide and 12½ inches deep with a height of 5½ inches and weigh of 74 lbs each. Each foot has 30 teeth (30) to help anchor the device. The large feet (26) sit on top of the ground without sinking to keep the device from rotating forward when making hard pulls.

The arms (27) are made from 3×6×¼ inch rectangular tubing. Each device requires two arms 35 inches long. These two arms (27) are cut to exact length. Next the 1¾ inch slugger bit is installed in the milling machine and holes are cut at each end of the arms (27) ¼ inch from the end and centered on the 3 inch side of the rectangular tubing of each arm (27).

Next we saw 4 more pieces of pipe from the same 1¾ inch pipe we used for the side rollers (4). These make up the hinges for the arms (27). The 6½ inch pipes are pushed into the 1¾ inch holes made by the slugger bit and welded solid. Then 2 inch long straight brass bushings (31) with 1 inch inside diameter and 1¼ outside diameter are inserted inside the pipe. Next we cut 2 pieces of 3 inch pipe 5¾ inches to close the ends of the arms (27) for a better appearance. The 5¾ inch pipe is then split into 2 pieces with the cutting torch and fitted to the ends of the arms (27) and welded solid. This completes the making of the arms (27).

Next we make the 4 arm pins (29) for both ends of the arms (27). They are sawed from 1 inch bar stock and each bar is 8½ inches long. This machine requires 4 arm brackets (28) for the arms (27) to be connected to. These arm brackets (28) have 5 holes drilled with a 1 inch bit. The arm brackets (28) are 8 inches long and 3 inches wide and 1 inch thick. The arm brackets (28) are welded to the backplate (19) and the arms (27) fitted between them and attached with the 1 inch arm pins (29). Next drill 1 inch holes in the cast feet (26) 1¼ inch from the top and center of the flanges on the feet (26). The feet (26) can now be attached to the arms (27) with the 1 inch arm pins (29).

Next we saw 2 depth adjuster bars (25) from 1×2 inch bar stock. Each depth adjuster bar (2) is 24 inches long and has a one 1 inch diameter hole in one end and six 1 inch diameter holes in the other end 1 inch apart to adjust the height of the feet (26) for different kinds of soil, sand, gravel, ice, etc.

The 8 adjuster bar brackets (32) needed to attach the depth adjuster bars (25) to the arms (27) and backplate (19) are 1 inch thick and 3 inches long with a 1 inch hole in the center. Next 1 inch diameter attaching pins (33) are cut to attach the depth adjuster bars (25) from the 1 inch bar stock. The 4 attaching pins (33) are 3½ inches long and are held in place by set screws once the depth attaching bars (25) are attached.

After all the work is done on the front of the baseplate (19) we bolt a 36 inch long, 4 inch by 4 inch I-Beam (34) directly behind the winch (1) on the back side of the baseplate (19) for extra strength.

Next we make the heavy duty quick attach receiver parts from ½ inch thick steel. The parts consist of a 17×40 inch rectangular receiver plate (35), two 24×3×½ inch receiver side plates (36), a 2×40×½ inch upper lock plate (38). Two 31 inch tall trapezoid shaped plates (39) 6½ inches wide at the top and 12½ inches wide at the bottom with 13/16 inch diameter holes laser cut 1 inch from the side edge down the full length of both sides of the trapezoid shaped plate (39).

The final 2 metal parts to the quick attach receiver are the plunger lock plates (40). The dimensions are 12×3½×½ inch and cut from steel plate. Next 5×1½ inch rectangular cuts are made on center in one end of the plunger lock plates (40) three inches from the end and another 2¼×1½ inch rectangular cut on center from the opposite end. These parts are then positioned and welded to the backplate (19). This completes the heavy duty quick attach receiver parts and all that remains is painting the device and attaching two hydraulic hoses (41) cut to 6 ft. length to the winch motor (46) and installing the quick coupler fittings (42) to plug into the skid steer loader or similar machines hydraulic supply. The device is now operational.

To operate, this device is quick attached to the skid steer loader or similar device and the 2 hydraulic hoses (41) are connected to the skid steer loader or similar machines hydraulic correctors making the winch (2) operational. When using the device, the operator should first choose high ground, then contact the ground with the bottom of the blade and apply down pressure from the skid steer loader or similar machine to penetrate the ground while also pushing with the skid steer loader or similar machine to bury the device to the depth plate height.

Next, the backplate (19) is rotated forward to contact the feet (26) to the ground for even more stability. The maximum down pressure is then hydraulically applied down on the device. The device is now anchored and ready for winching.

The operator then steps out of the machine and turns the winch spool kickout lever (43) to unwind the winch cable (2) with hook (44), then drags it to the stuck vehicle or load. The cable (2) with hook (44) is then attached to the vehicle or load to be winched. Then operator then engages the winch spool kickout (43) and returns to his seat in the machine. The vehicle or load can then be winched forward to the skid steer loader or similar machine or any distance in between. The winch cable (2) is then disconnected from the vehicle or load and rewound to the winch cable spool (45). This completes the job so the operator of the skid steer loader or similar machine hydraulically lifts the off road recovery device from it's anchored position in the ground and returns to the truck to be loaded.

This device solves the problem of not only getting to a very hard job but also saves wear on machinery and rubber tracks while providing greater safety since this device was made for this particular job.

While the invention has been described with a certain degree of particularity, it is manifest that many changes may be made in the details of construction and the arrangement of components without departing from the spirit and scope of this disclosure.

It is understood that the invention is not limited to the embodiments set forth herein for the purposes of exemplification, but is to be limited only by the scope of the attached claim or claims, including the full range of equivalency to which each element thereof is entitled.

What I claim as my invention is:

1. An attachable hydraulic powered horizontal winching apparatus for skid steer vehicles for winching disabled vehicles into a desired location comprising:
   a steel backplate having a bottom edge with V shaped teeth to penetrate the ground; a front side with first mounting holes for mounting a hydraulic powered winch with a cable wound on a drum and a hook capable of winching disabled vehicles, and second mounting holes for mounting one or more stabilizing arms and feet to stabilize the device when in use by penetrating the ground and also capable of keeping the winching apparatus in an upright position when disconnected from the skid steer vehicle; and a back side having means for attaching the apparatus to the skid steer vehicle; and
   the hydraulic powered horizontal winching apparatus functionally connected to a hydraulic power supply of the skid steer loader and operated by hydraulic control valves located inside a cab of the skid steer loader for raising and lowering the base plate to penetrate the ground, raising and lowering the one or more stabilizing arms and feet to contact the ground, and operating the hydraulic winch motor to wind and unwind the cable onto the drum.

2. The attachable hydraulic powered horizontal winching apparatus according to claim 1, wherein the one or more stabilizing arms and feet is at least two stabilizing arms and feet.

3. The attachable hydraulic powered horizontal winching apparatus according to claim 2, wherein the at least two stabilizing feet have teeth for gripping the ground.

4. The attachable hydraulic powered horizontal winching apparatus according to claim 1, wherein the bottom edge of the steel backplate is angled forward.

\* \* \* \* \*